(12) United States Patent
Nakamura

(10) Patent No.: US 8,248,478 B2
(45) Date of Patent: Aug. 21, 2012

(54) RECEIVER, SITUATION-OF-INSTALLATION NOTIFICATION METHOD, AND TRANSMITTING AND RECEIVING SYSTEM

(75) Inventor: Hitoshi Nakamura, Tokyo (JP)

(73) Assignee: Sony Corporation (JP)

( * ) Notice: Subject to any disclaimer, the term of this patent is extended or adjusted under 35 U.S.C. 154(b) by 558 days.

(21) Appl. No.: 12/455,405

(22) Filed: Jun. 2, 2009

(65) Prior Publication Data

US 2009/0309978 A1  Dec. 17, 2009

(30) Foreign Application Priority Data

Jun. 13, 2008 (JP) ................. P2008-155423

(51) Int. Cl.
*H04N 17/00* (2006.01)
*H04N 17/02* (2006.01)
(52) U.S. Cl. ....................... 348/192; 348/193
(58) Field of Classification Search .......... 348/192, 348/180, 193; 725/72
See application file for complete search history.

(56) References Cited

U.S. PATENT DOCUMENTS

2005/0175024 A1* 8/2005 Ho et al. ............ 370/412
2008/0045175 A1* 2/2008 Yoon et al. ............ 455/188.1

FOREIGN PATENT DOCUMENTS

| JP | 09247128 A | 9/1997 |
| JP | 10013131 A | 1/1998 |
| JP | 2001069092 A | 3/2001 |
| JP | 2004096595 A | 3/2004 |
| JP | 2006101293 A | 4/2006 |
| JP | 2008-061056 A | 3/2008 |

OTHER PUBLICATIONS

Office Action from Japanese Application No. 2008-155423, dated Apr. 28, 2010.
Office Action from Japanese Application No. 2008-155423, dated Aug. 19, 2010.

* cited by examiner

*Primary Examiner* — Ngoc Vu
(74) *Attorney, Agent, or Firm* — Lerner, David, Littenberg, Krumholz & Mentlik, LLP

(57) ABSTRACT

A receiver includes: a band detection unit that detects a frequency band within which the receiver can be connected to a transmitter by radio; a quality detection unit that detects the transmission quality level of video data, which is transmitted from the transmitter, using the frequency band detected by the band detection unit; and a notification unit that notifies an area in which the frequency band within which the receiver can be connected to the transmitter by radio is detected and the transmission quality level is detected to be higher than a predetermined threshold.

7 Claims, 5 Drawing Sheets

OVERALL CONSTITUTION OF TELEVISION SET

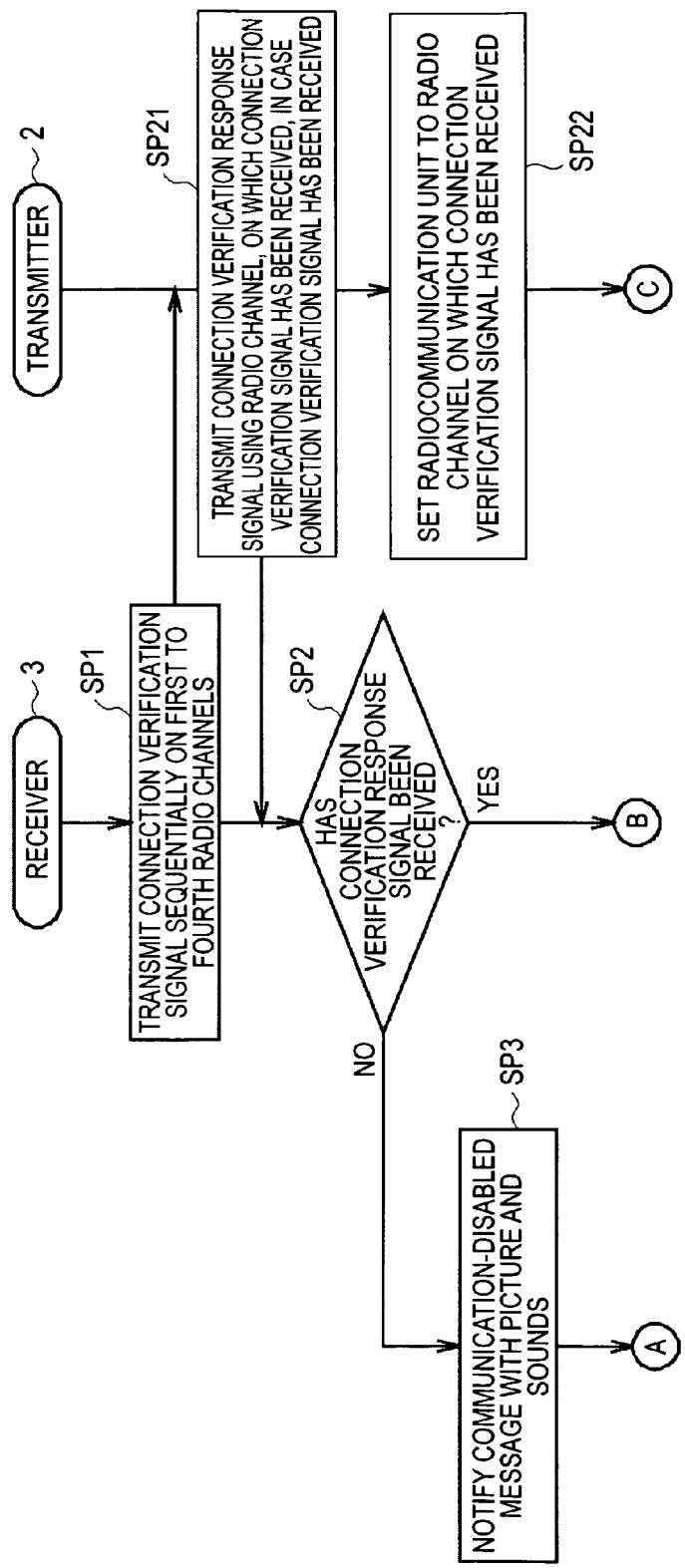

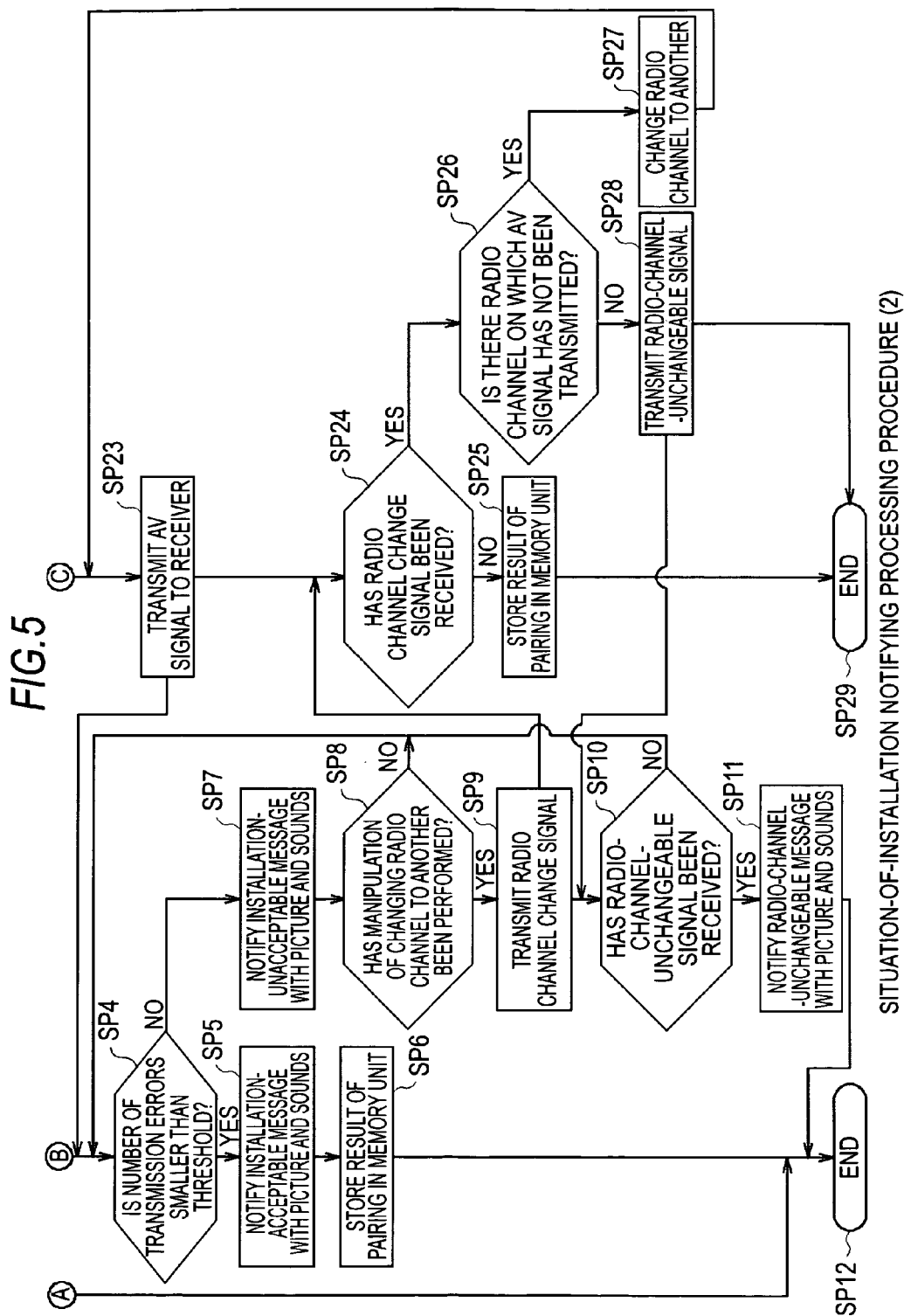

RECEIVER, SITUATION-OF-INSTALLATION NOTIFICATION METHOD, AND TRANSMITTING AND RECEIVING SYSTEM

The present application claims priority from Japanese Patent Application No. JP 2008-155423 filed in the Japanese Patent Office on Jun. 13, 2008, the entire content of which is incorporated herein by reference.

BACKGROUND OF THE INVENTION

1. Field of the Invention

The present invention relates to a receiver, a situation-of-installation notification method, and a transmitting and receiving system, and is preferably applied to a television set having, for example, a transmitter and a receiver thereof connected to each other by radio.

2. Description of the Related Art

In recent years, television sets each having a display formed with a liquid crystal panel or organic electroluminescent panel have prevailed. Accordingly, the television sets are requested to have a thin shape.

As one of the television sets, a television set in which: a transmitter including a tuner, a decoder, and others is separated from a receiver, which includes a display, a loudspeaker, and others, in order to achieve a thin shape; and the transmitter and receiver are connected to each other by radio has been proposed (refer to, for example, JP-A-2008-61056 (patent document 1)).

The television set is designed so that when radio connection between the transmitter and receiver is established, a light-emitting diode (LED) included in, for example, the transmitter is lit or a message saying that the radio connection has been established is displayed on the display of the receiver.

SUMMARY OF THE INVENTION

By the way, as far as radio transmission is concerned, it is known that the longer a transmission distance is, the lower a transmission speed is.

In the television set, when the transmitter and receiver are installed by a user, even if the radio connection between the transmitter and receiver is established, the distance between the transmitter and receiver is long. The transmission speed at which video data is transmitted from the transmitter to the receiver is so low that a picture represented by the video data may not be displayed on the display.

However, since the radio connection between the transmitter and receiver is established, the television set may display the message saying that the radio connection has been established, and may not notify the user of a situation in which a picture may not be displayed on the display.

Thus, it is desirable to provide a receiver, a situation-of-installation notification method, and a transmitting and receiving system capable of notifying the situation of installation of a transmitter and a receiver in more detail than before.

According to an embodiment of the present invention, there is provided a receiver including a band detection unit that detects a frequency band within which the receiver can be connected to a transmitter by radio, a quality detection unit that detects the transmission quality level of video data transmitted from the transmitter using the frequency band detected by the band detection unit, and a notification unit that notifies an area in which the frequency band within which the receiver can be connected to the transmitter by radio is detected and the transmission quality level is detected to be higher than a predetermined threshold.

A situation-of-installation notification method according to an embodiment of the present invention includes the steps of detecting a frequency band within which a receiver can be connected to a transmitter by radio, detecting the transmission quality level of video data transmitted from the transmitter using the frequency band detected in the frequency band detecting step, and notifying an area in which the frequency band within which the receiver can be connected to the transmitter by radio and the transmission quality level is detected to be higher than a predetermined threshold.

Further, a transmitting and receiving system according to an embodiment of the present invention includes a transmitter that transmits video data and a receiver that receives the video data. The transmitter includes an acquisition unit that acquires the video data, and a transmission unit that communicates the video data by radio. The receiver includes a band detection unit that detects a frequency band within which the receiver can be connected to the transmitter by radio, a quality detection unit that detects the transmission quality level of video data transmitted from the transmitter using the frequency band detected by the band detection unit, and a notification unit that notifies an area in which the frequency band within which the receiver can be connected to the transmitter by radio is detected and the transmission quality level is detected to be higher than a predetermined threshold.

A frequency band within which a receiver can be connected to a transmitter by radio is detected, and the frequency band is used to detect the transmission quality level of video data transmitted from the transmitter. Therefore, an area in which the frequency band within which the receiver can be connected to the transmitter by radio is detected and the transmission quality level is detected to be higher than a threshold can be notified.

According to the embodiments of the present invention, a receiver, a situation-of-installation notification method, and a transmitting and receiving system capable of notifying the situation of installation of a transmitter and a receiver in more detail than before can be realized. This is because: a frequency band within which a receiver can be connected to a transmitter by radio is detected, and the frequency band is used to detect the transmission quality level of video data transmitted from the transmitter; and an area in which the frequency band within which the receiver can be connected to the transmitter by radio is detected and the transmission quality level is detected to be higher than a predetermined threshold can therefore be notified.

BRIEF DESCRIPTION OF THE DRAWINGS

FIG. 4 is a sequence chart for use in explaining a situation-of-installation notifying processing procedure (1); and FIG. 5 is a sequence chart for use in explaining a situation-of-installation notifying processing procedure (2).

DESCRIPTION OF THE PREFERRED EMBODIMENTS

Figure 1:
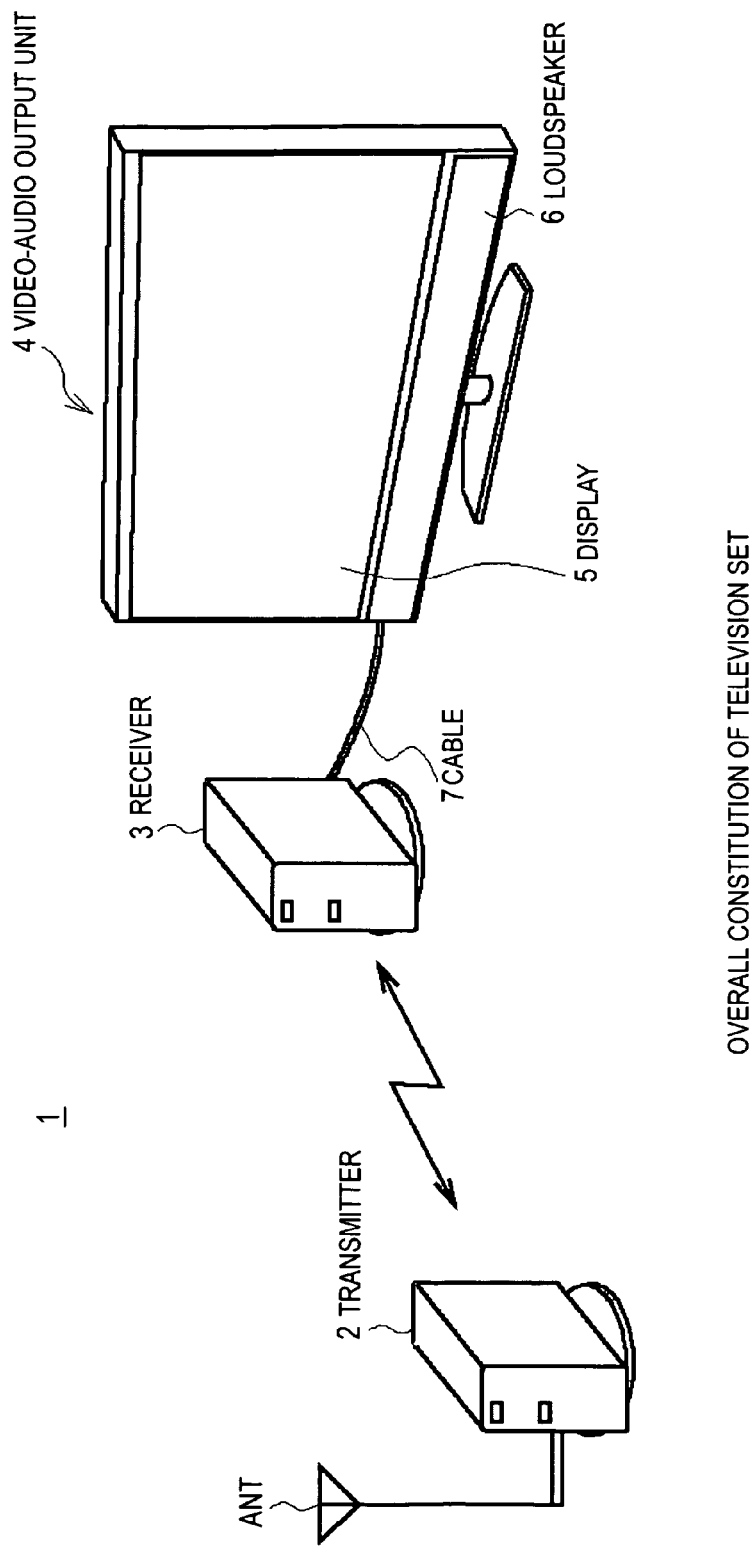
FIG. 1 is a schematic diagram showing the overall constitution of a television set.

Referring to the drawings, an embodiment of the present invention will be described below.

(1) Constitution of a Television Set (1-1) Overall Constitution of the Television Set As shown in FIG. 1, the television set 1 as an embodiment of the present invention includes a transmitter 2, a receiver 3, and a video-audio output unit 4. The transmitter 2 and receiver 3 are connected to each other by radio.

The transmitter 2 performs decoding processing or the like on a television broadcast signal received through an antenna ANT, and transmits an audiovisual (AV) signal, which includes video data and audio data that result from the decoding processing, to the receiver 3 by radio.

After receiving the AV signal transmitted from the transmitter 2 by radio, the receiver 3 performs predetermined signal processing or the like on the AV signal, and transmits video data and audio data, which result from the signal processing, to the video-audio output unit 4 over a cable 7 including a high-definition multimedia interface (HDMI) cable.

After receiving the video data and audio data from the receiver 3, the video-audio output unit 4 displays a picture represented by the video data on a display 5, and outputs sounds represented by the audio data through a loudspeaker 6.

(1-2) Circuitry of the Transmitter

Figure 2:
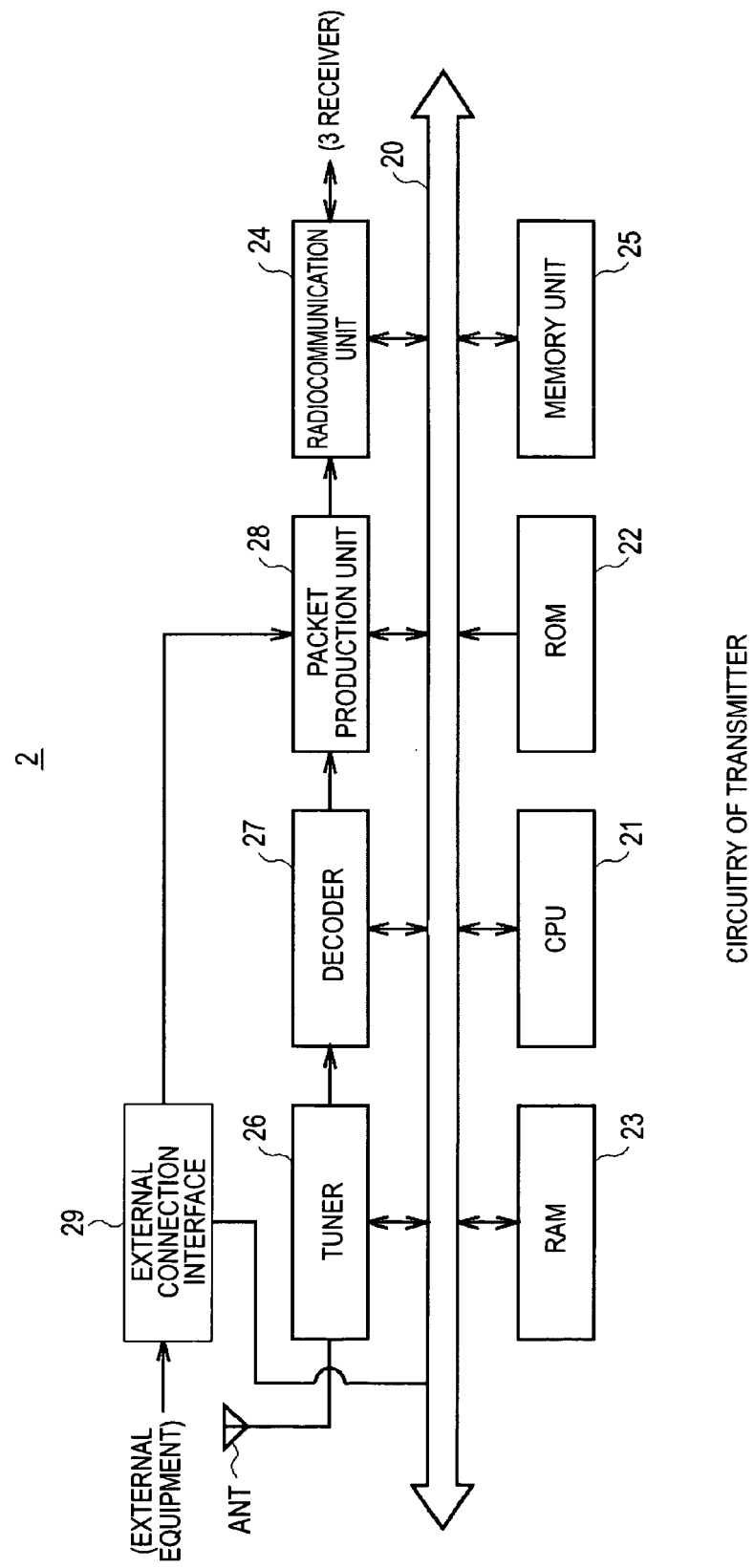
FIG. 2 is a schematic diagram showing the circuitry of a transmitter.

As shown in FIG. 2, in the transmitter 2, a CPU 21 centralizes and controls the whole of the transmitter over a bus 20 according to a basic program that is read from a ROM 22 and activated in a RAM 23, and executes various pieces of processing according to various application programs.

The transmitter 2 includes a radiocommunication unit 24 realized with, for example, a radiocommunication module conformable to the Institute of Electrical and Electronics Engineers (IEEE) standard 802.11. The radiocommunication unit 24 is set to, for example, the first radio channel out of four radio channels (first to fourth radio channels) to which four different frequency bands are assigned. Using the first radio channel, the transmitter 2 is connected to the receiver 3 by radio via the radiocommunication unit 24.

When the transmitter is connected to the receiver 3 by radio via the radiocommunication unit 24, the CPU 21 stores the radio channel, to which the radiocommunication unit 24 is set, as a result of pairing in a memory unit 25.

When a television broadcast signal broadcasted from a broadcasting station is received through the antenna ANT, a tuner 26 extracts a television channel selection signal, which represents a predetermined broadcast channel, from the television broadcast signal, and transmits the extracted television channel selection signal to a decoder 27.

The decoder 27 decodes the television channel selection signal fed from the tuner 26, and transmits video data and audio data, which results from the decoding, to a packet production unit 28.

The packet production unit 28 segments the video data and audio data, which are fed from the decoder 27, in units of a predetermined data length, appends a header and an error detection code (hereinafter, will be called as a cyclic redundancy check (CRC) character) to the resultant segments of the video data and audio data, and thus produces packet data items. The packet production unit 28 outputs an AV signal, which includes numerous packet data items, to the receiver 3 via the radiocommunication unit 24.

When external equipment such as a digital versatile disk (DVD) recorder or a Blu-Ray (registered trademark) player is plugged into an external connection interface 29 over, for example, an HDMI cable, if video data and audio data are inputted from the external equipment, the transmitter 2 acquires the video data and audio data.

In the transmitter 2, similarly to when a television broadcast signal is received, when the video data and audio data acquired from the external equipment are transmitted to the packet production unit 28, the packet production unit 28 produces an AV signal which includes numerous packet data items, and outputs the AV signal to the receiver 3 via the radiocommunication unit 24.

(1-3) Circuitry of the Receiver

Figure 3:
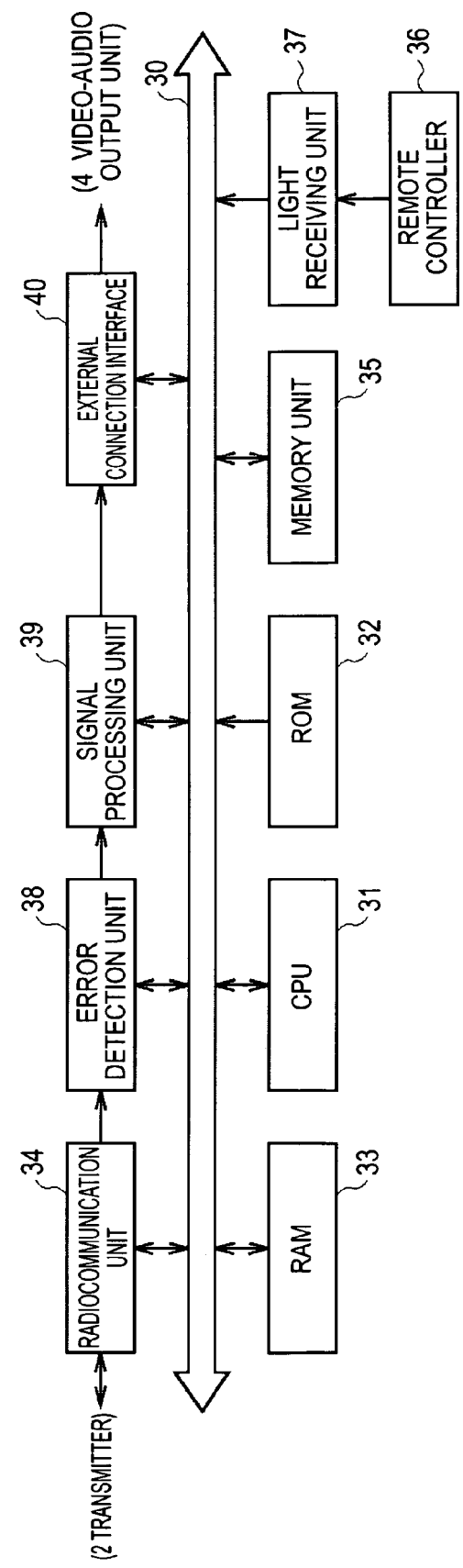
FIG. 3 is a schematic diagram showing the circuitry of a receiver.

As shown in FIG. 3, in the receiver 3, a CPU 31 centralizes and controls the whole of the receiver over a bus 30 according to a basic program that is read from a ROM 32 and activated in an RAM 33, and executes various pieces of processing according to various application programs.

Similarly to the transmitter 2, the receiver 3 includes a radiocommunication unit 34 realized with, for example, a radiocommunication module conformable to any of the IEEE 802.11 series of standards. The radiocommunication unit 34 is set to a radio channel, which is identical to the radio channel to which the radiocommunication unit 24 of the transmitter 2 is set, out of four radio channels to which four different frequency bands are assigned. Using the radio channel, the receiver 3 is connected to the transmitter 2 by radio.

When the receiver is connected to the transmitter 2 by radio via the radiocommunication unit 34, the CPU 31 stores the radio channel, to which the radiocommunication unit 34 is set, as a result of pairing in a memory unit 35.

After receiving the AV signal from the transmitter 2 via the radiocommunication unit 34, the receiver 3 transmits the AV signal to an error detection unit 38.

When the AV signal is fed to the error detection unit via the radiocommunication unit 34, the error detection unit 38 segments the AV signal into numerous packet data items. A CRC character appended to packet data is used to detect whether a transmission error has occurred in a header of the packet data and in video data or audio data of a predetermined length.

After performing such error checking processing, the error detection unit 38 transmits the packet data items to a signal processing unit 39.

The signal processing unit 39 separates each of the packet data items, which are fed from the error detection unit 38, into video data and audio data on the basis of the header appended to the packet data, and outputs the video data and audio data to the video-audio output unit 4 (FIG. 1) via an external connection interface 40 over the cable 7 (FIG. 1).

After receiving the video data and audio data from the receiver 3 over the cable 7, the video-audio output unit 4 displays a picture, which is represented by the video data, on the display 5, and outputs sounds, which are represented by the audio data, through the loudspeaker 6.

Incidentally, the receiver 3 receives an instruction from a remote controller 36 via a light receiving unit 37. The instruction is transferred to the CPU 31, whereby various pieces of processing are executed based on the instruction.

(2) Situation-of-Installation Notifying Processing Procedure

A description will be made of a situation-of-installation notifying processing procedure according to which when the transmitter 2 and receiver 3 are installed by a user, the user is notified of an installation area in which the transmitter 2 and receiver 3 can be connected to each other by radio and a transmission error hardly occurs in an AV signal.

In the television set 1, after the transmitter 2 and receiver 3 are installed at user-desired installation positions, power is supplied responsively to manipulations performed to depress the power buttons (not shown) of the transmitter 2 and receiver 3 respectively. In the television set 1, when an installation verification menu for use in establishing the radio connection between the transmitter 2 and receiver 3 is selected using, for example, the remote controller 36, the transmitter 2 and receiver 3 execute situation-of-installation notifying processing.

At step SP1, the CPU 31 of the receiver 3 sets, as described in FIG. 4 and subsequent FIG. 5, the radiocommunication unit 34 sequentially to the first to fourth radio channels, and sequentially uses the designated first to fourth radio channels to transmit a connection verification signal, which is used to verify whether the receiver can be connected to the transmitter 2 by radio, to the transmitter 2 via the radio communication unit 34.

At step SP21, assuming that the CPU 21 of the transmitter 2 receives the connection verification signal, which is transmitted from the receiver 3, on each of, for example, the first, second, and fourth radio channels, the CPU 21 sets the radiocommunication unit 24 sequentially to the first, second, and fourth radio channels. The CPU 2 of the transmitter 2 sequentially uses the first, second, and fourth radio channels to transmit a connection verification response signal, which corresponds to the connection verification signal sent from the receiver 3, to the receiver 3 via the radiocommunication unit 24.

The CPU 31 of the receiver 3 transmits the connection verification signal to the transmitter 2 at step SP1, and then proceeds from step SP1 to step SP2. At step SP2, the CPU 31 of the receiver 3 decides whether the CPU 31 has received the connection verification response signal from the transmitter 2. If the decision is "Yes", it means that the transmitter 2 and receiver 3 can be connected to each other by radio. The CPU 31 then proceeds to the next step SP4 (FIG. 5).

In contrast, if the decision is "No" at step SP2, it means that the transmitter 2 and receiver 3 may not be connected to each other by radio on any radio channel. The CPU 31 of the receiver 3 proceeds to the next step SP3.

As a cause disabling the transmitter 2 and receiver 3 from being connected to each other by radio, for example, the distance between the transmitter 2 and receiver 3 is so long that the connection verification signal sent from the receiver 3 may not reach the transmitter 2. As another cause, for example, since one or both of the transmitter 2 and receiver 3 are placed on a metallic shelf or rack, radio waves sent from the receiver 3 may be blocked by the shelf or rack.

At step SP3, the CPU 31 of the receiver 3 outputs communication-disabled video data and communication-disabled audio data, which represent a communication-disabled message, to the video-audio output unit 4 through the external connection interface 40, and then proceeds to step SP12 so as to terminate the processing. The communication-disabled message signifies that the transmitter 2 and receiver 3 may not communicate with each other by radio, and says, for example, "Shorten the distance between the transmitter and receiver." or "Do not place each of the transmitter and receiver on a metallic shelf or rack."

At this time, when receiving the communication-disabled video data and communication-disabled audio data from the receiver 3, the video-audio output unit 4 displays a picture, which is represented by the communication-disabled video data, on the display 5, and outputs sounds, which are represented by the communication-disabled audio data, through the loudspeaker 6.

Thus, the receiver 3 notifies a user of the fact that the transmitter 2 and receiver 3 are not connected to each other by radio, and notifies the user of the cause, that is, the fact that the distance between the transmitter 2 and receiver 3 is too far or that radio waves sent from the receiver 3 are blocked by a radio-wave inhibitive factor.

The CPU 21 of the transmitter 2 transmits the connection verification response signal to the receiver 3 at step SP21, and then proceeds from step SP21 to step SP22. At step SP22, the CPU 21 of the transmitter 2 sets the radiocommunication unit 24 to, for example, the first radio channel out of the first, second, and fourth radio channels on which the connection verification signal can be received at step SP21, and then proceeds to the next step SP23.

At step SP23, the CPU 21 of the transmitter 2 uses the radio channel (first radio channel), which the CPU 21 has designated at step SP22, to transmit an AV signal to the receiver 3 via the radiocommunication unit 24.

At step SP4, the CPU 31 of the receiver 3 receives the AV signal from the transmitter 2 via the radiocommunication unit 24. After the AV signal is segmented into numerous packet data items, the error detection unit 38 executes error checking processing on the packet data items. The CPU 31 of the receiver 3 decides whether, for example, the transmission error rate of packet data is lower than a threshold that is set to a value that does not permit display of a picture on the display 5.

In radiocommunication, the longer the transmission distance is, the lower the transmission speed is. Therefore, as the transmission distance gets longer, the transmission error rate rises.

If the decision is "Yes" at step SP4, it means that the transmission error rate of the AV signal sent from the transmitter 2 is low and that the installation positions of the transmitter and receiver 3 respectively are acceptable. The CPU 31 of the receiver 3 proceeds to the next step SP5.

At step SP5, the CPU 31 of the receiver 3 outputs installation-acceptable video data and installation-acceptable audio data, which represent an installation-acceptable message saying, for example, "The situation of installation is acceptable." to the video-audio output unit 4 via the external connection interface 40, and proceeds to step SP6.

When receiving the installation-acceptable video data and installation-acceptable audio data from the receiver 3, the video-audio output unit 4 displays a picture, which is represented by the installation-acceptable video data, on the display 5, and outputs sounds, which are represented by the installation-acceptable audio data, through the loudspeaker 6.

Thus, the receiver 3 notifies the user of the fact that the installation positions of the transmitter 2 and receiver 3 respectively are acceptable.

At step SP6, the CPU 31 of the receiver 3 stores the radio channel, to which the radiocommunication unit 34 is currently set (in this case, the first radio channel), as a result of pairing in the memory unit 35, and proceeds to the next step SP12 so as to terminate the processing.

If the decision is "No" at step SP4, it means that the receiver 3 is located in an area in which the receiver 3 can be connected to the transmitter 2 by radio and a transmission error rate is too high to display a picture on the display 5. Otherwise, an AV signal sent on a radio channel to which the radiocommunication unit 24 of the transmitter 2 is set and a signal sent from any other wireless equipment may conceivably interfere with each other.

If the decision is "No" at step SP4, the CPU 31 of the receiver 3 proceeds to the next step SP7. The CPU 31 then outputs installation-unacceptable video data and installation-unacceptable audio data, which represent a situation-of-installation-unacceptable message, to the video-audio output unit 4 through the external connection interface 40, and proceeds to the next step SP8. The situation-of-installation-unacceptable message says, for example, "The situation of installation is unacceptable. Change the radio channel to another or shorten the distance between the transmitter and receiver."

When receiving the installation-unacceptable video data and installation-unacceptable audio data from the receiver 3, the video-audio output unit 4 displays a picture, which is represented by the installation-unacceptable video data, on the display 5, and outputs sounds, which are represented by the installation-unacceptable audio data, through the loudspeaker 6.

Thus, the receiver 3 notifies a user of the fact that the installation positions of the transmitter 2 and receiver 3 respectively are unacceptable, and notifies the user of the countermeasure that the user should change the radio channel to another or shorten the distance between the transmitter 2 and receiver 3.

At step SP8, the CPU 31 of the receiver 3 decides whether a radio channel changing manipulation has been performed on the remote controller 36 by, for example, a user. If the decision is "No", the CPU 31 returns to step SP4 and resumes quality measurement of an AV signal.

In contrast, if the decision is "Yes" at step SP8, the CPU 31 of the receiver 3 proceeds to the next step SP9.

At step SP9, the CPU 31 of the receiver 3 transmits a radio channel change signal, which is used to cause the transmitter to transmit an AV signal on a radio channel different from the currently designated radio channel, to the transmitter 2.

The CPU 21 of the transmitter 2 transmits an AV signal to the receiver 3 at step SP23, and then proceeds from step SP23 to step SP24. At step SP24, the CPU 21 of the transmitter 2 decides whether a radio channel change signal sent from the receiver 3 has been received.

If the decision is "No" at step SP24, it means that the receiver 3 is receiving an AV signal at a transmission error rate, which is lower than a threshold, on the currently designated radio channel. The CPU 21 of the receiver 2 proceeds to the next step SP25.

At step SP25, the CPU 21 of the transmitter 2 stores the radio channel, to which the radiocommunication unit 24 is currently set, as a result of pairing in the memory unit 25, and proceeds to the next step SP29 so as to terminate the processing.

In contrast, if the decision is "Yes" at step SP24, it means that when the receiver 3 receives an AV signal using a currently designated radio channel, the transmission error rate of the AV signal is higher than the threshold. The CPU 21 of the transmitter 2 proceeds to the next step SP26.

At step SP26, the CPU 21 of the transmitter 2 decides whether a radio channel on which an AV signal has not been transmitted is included in the first, second, and fourth radio channels on which the connection verification signal has been received at step SP21.

If the decision is "Yes" at step SP26, the CPU 21 of the transmitter 2 proceeds to the next step SP27, changes the setting of the radiocommunication unit 24 from, for example, the first radio channel to the second radio channel, and then returns to step SP23.

In contrast, if the decision is "No" at step SP26, it means that the transmission error rate of an AV signal transmitted on the first, second, and fourth radio channels on which the connection verification signal has been received at step SP21 is higher than the threshold. The CPU 21 of the transmitter 2 proceeds to the next step SP28.

At step SP28, the CPU 21 of the transmitter 2 transmits a radio-channel-unchangeable signal, which signifies that the radio channel may not be changed to another, to the receiver 3, and proceeds to step SP29 so as to terminate the processing.

The CPU 31 of the receiver 3 transmits a radio channel change signal to the transmitter 2 at step SP9, and then proceeds from step SP9 to step SP10. At step SP10, the CPU 31 of the receiver 3 decides whether the radio-channel-unchangeable signal has been received from the transmitter 2.

If the decision is "No" at step SP10, it means that the transmitter 2 has changed the radio channel to another and uses the new radio channel to transmit an AV signal. The CPU 31 of the receiver 3 returns to step SP4.

In contrast, if the decision is "Yes" at step SP10, it means that the transmission error rate of an AV signal is higher than the threshold on all radio channels on which the transmitter 2 and receiver 3 can be connected to each other by radio. In other words, unless the installation positions of the transmitter 2 and receiver 3 are changed to others, the transmission error rate of the AV signal will not fall.

If the decision is "Yes" at step SP10, the CPU 31 of the receiver 3 proceeds to the next step SP11. The CPU 31 outputs radio-channel-unchangeable video data and radio-channel-unchangeable audio data, which represent a radio-channel-unchangeable message, to the video-audio output unit 4 through the external connection interface 40, and proceeds to the next step SP12 so as to terminate the processing. What is referred to as the radio-channel-unchangeable message is a message saying, for example, "A transmission error has occurred on all the radio channels. Shorten the distance between the transmitter and receiver."

When receiving the radio-channel-unchangeable video data and radio-channel-unchangeable audio data from the receiver 3, the video-audio output unit 4 displays a picture, which is represented by the radio-channel-unchangeable video data, on the display 5, and outputs sounds, which are represented by the radio-channel-unchangeable audio data, through the loudspeaker 6.

Thus, the receiver 3 notifies a user of the fact that the transmission error rate of an AV signal is higher than the threshold on all the radio channels on which the receiver 3 can be connected to the transmitter 2 by radio, and also notifies the user of the countermeasure that the user should shorten the distance between the transmitter 2 and receiver 3.

(3) Operation and Advantage

In the foregoing constitution, the receiver 3 detects a radio channel on which the receiver can be connected to the transmitter 2 by radio, and detects the transmission error rate of an AV signal transmitted on the detected radio channel.

The fact that the receiver 3 is located in an area, in which a radio channel on which the receiver 3 can be connected to the transmitter 2 by radio is detected and the transmission error rate of an AV signal is higher than the threshold, is notified with a picture and sounds through the display 5 and loudspeaker 6 respectively. Thus, the receiver 3 can notify the situation of installation of the transmitter 2 and receiver 3 in more detail than that in the related art.

Incidentally, in the television set 1, the radio transmission distance between the transmitter 2 and receiver 3 has been extended along with improvement in radio performance, and the transmitter 2 and receiver 3 can be separated from each other by a longer distance.

Therefore, in the television set 1, when the transmitter 2 and receiver 3 are installed by a user, even if the transmitter 2 and receiver 3 can be connected to each other by radio, an area in which the transmission speed of an AV signal transmitted from the transmitter 2 to the receiver 3 is low and many transmission errors occur in the AV signal would expand.

The number of occasions on which the receiver 3 is located in an area in which a radio channel on which the receiver 3 can be connected to the transmitter 2 by radio is detected and the transmission error rate is higher than the threshold is thought to increase. It would therefore be more advantageous if the receiver 3 notifies a user of the fact that the receiver 3 is located in an area in which a radio channel on which the receiver can be connected to the transmitter 2 by radio is detected and the transmission error rate is higher than the threshold.

According to the aforesaid constitution, the fact that the receiver 3 is located in an area in which a radio channel on which the receiver can be connected to the transmitter 2 by radio is detected and the transmission error rate is higher than the threshold is notified with a picture and sounds through the display 5 and loudspeaker 6 respectively. Thus, the receiver 3 can notify the situation of installation of the transmitter 2 and receiver 3 in more detail than that in the related art.

(4) Other Embodiments

In the aforesaid embodiment, the receiver 3 notifies a user of various messages with a picture and sounds through the display 5 and loudspeaker 6 respectively. However, the present invention is not limited to this mode. For example, the transmitter 2 may be provided with a loudspeaker, and various messages may be notified with sounds through the loudspeaker.

The foregoing transmitter 2 would prove useful especially in a case where since the transmitter 2 is installed in a room different from the room in which the receiver 3 lies, a user may not be able to discern the display 5 or may not be able to hear sounds outputted through the loudspeaker 6.

In the aforesaid embodiment, the receiver 3 is connected to the video-audio output unit 4 over the cable 7. However, the present invention is not limited to this mode. Alternatively, the video-audio output unit 4 and receiver 3 may be integrated into one unit.

In the aforesaid embodiment, the threshold for the transmission error rate of an AV signal is set to a value that does not permit display of a picture on the display 5. However, the present invention is not limited to this mode. For example, the receiver 3 may vary the threshold according to a manipulation a user performs on the remote controller 36.

The receiver 3 allows a user to select a threshold, and thus allows the user to select a boundary between an area, in which the installation positions are thought to be acceptable by the user, and an area, in which the installation positions are thought to be unacceptable thereby, within an area, in which the receiver 3 can be connected to the transmitter 2 by radio, from the viewpoint of picture quality.

Therefore, the receiver 3 allows a user to select a threshold and thus allows the user to install the transmitter 2 and receiver 3 in consideration of the balance between the distance between the transmitter 2 and receiver 3 and the quality of a picture.

In the aforesaid embodiment, the threshold for the transmission error rate of an AV signal is set to a value that does not permit display of a picture on the display 5, and a user is notified of whether the transmission error rate is higher than the threshold. However, the present invention is not limited to this mode. Alternatively, the receiver 3 may vary the volume of sounds to be outputted through the loudspeaker 6 according to the transmission error rate of the AV signal.

To be more specific, the receiver 3 associates 0 with a value 0 of the transmission error rate of an AV signal, associates 9 with a value of the transmission error rate that does not permit display of a picture on the display 5, and thus varies the volume of sounds, which are outputted through the loudspeaker 6, in, for example, ten steps according to the transmission error rate.

Accordingly, the receiver 3 can allow a user to install the transmitter 2 and receiver 3 while hearing the sounds outputted through the loudspeaker 6, and can thus allow the user to select the installation positions in consideration of the balance between the distance between the transmitter 2 and receiver 3 and the quality of a picture.

In the aforesaid embodiment, a CRC character appended to packet data is checked to detect a transmission error rate as a transmission quality level. However, the present invention is not limited to this mode. For example, after separating an AV signal received from the transmitter 2 into video data and audio data, the receiver 3 may detect the transmission quality level on the basis of the signal-to-noise ratio of the video data or audio data.

The receiver 3 may detect the transmission quality level of an AV signal, which is transmitted from the transmitter 2, by combining transmission error checking processing, which employs a CRC character, with processing of detecting the transmission quality level on the basis of the signal-to-noise ratio of video data or audio data.

In the aforesaid embodiment, the CPU 31 of the transmitter 3 performs the aforesaid situation-of-installation notifying processing procedure according to an application program stored in advance in the ROM 32. However, the present invention is not limited to this mode. Alternatively, the CPU 31 of the transmitter 3 may perform the aforesaid situation-of-installation notifying processing procedure according to an application program installed from a storage medium, an application program downloaded from the Internet, or an application program installed along any of other various routes.

In the aforesaid embodiment, the receiver 3 as the receiver of an embodiment of the present invention is realized using the CPU 31 as a band detection unit, the error detection unit 38 as a quality detection unit, and the CPU 31 as a notification unit. The present invention is not limited to this mode. Alternatively, the receiver may include the band detection unit, quality detection unit, and notification unit that are realized with any of other various components.

The receiver of an embodiment of the present invention can be adapted to, for example, a music player or a personal computer having a transmitter and the receiver connected to each other by radio.

It should be understood by those skilled in the art that various modifications, combinations, sub-combinations and alterations may occur depending on design requirements and other factors insofar as they are within the scope of the appended claims or the equivalents thereof.

What is claimed is:

1. A receiver comprising:
   a band detection unit that detects a frequency band within which the receiver can be connected to a transmitter by radio;
   a quality detection unit that detects transmission quality level of video data, which is transmitted from the transmitter, using the frequency band detected by the band detection unit; and
   a notification unit that provides a notification for a user as to whether or not a current position of the receiver enables detection of the frequency band within which the receiver can be connected to the transmitter by radio and the transmission quality level to be higher than a predetermined threshold, so as to notify the user if the current position of the receiver is acceptable or not,
   in which when the notification indicates that the current position of the receiver is unacceptable the notification indicates (i) a cause as to why the current position of the receiver is unacceptable or (ii) a countermeasure to change an unacceptable condition to an acceptable condition.

2. The receiver according to claim 1, further comprising a threshold designation unit that designates the threshold so that the threshold can be varied.

3. The receiver according to claim 1, wherein the notification unit provides the notification with sounds through a loudspeaker.

4. The receiver according to claim 1, wherein the quality detection unit detects the transmission quality level on the basis of a transmission error rate of the video data transmitted from the transmitter.

5. The receiver according to claim 1, wherein the quality detection unit detects the transmission quality level on the basis of a signal-to-noise ratio of the video data transmitted from the transmitter.

6. A situation-of-installation notification method comprising the steps of:
  detecting a frequency band within which a receiver can be connected to a transmitter by radio;
  detecting transmission quality level of video data, which is transmitted from the transmitter, using the frequency band detected in the frequency band detecting step; and
  providing a notification for a user as to whether or not a current position of the receiver enables detection of the frequency band within which the receiver can be connected to the transmitter by radio and the transmission quality level to be higher than a predetermined threshold, so as to notify the user if the current position of the receiver is acceptable or not,
  in which when the notification indicates that the current position of the receiver is unacceptable the notification indicates (i) a cause as to why the current position of the receiver is unacceptable or (ii) a countermeasure to change an unacceptable condition to an acceptable condition.

7. A transmitting and receiving system comprising:
  a transmitter that transmits video data; and
  a receiver that receives the video data, wherein,
  the transmitter includes
  an acquisition unit that acquires the video data, and
  a transmitting unit that communicates the video data by radio, and
  the receiver includes
  a band detection unit that detects a frequency band within which the receiver can be connected to the transmitter by radio,
  a quality detection unit that detects transmission quality level of video data which is transmitted from the transmitter using the frequency band detected by the band detection unit, and
  a notification unit that provides a notification for a user as to whether or not a current position of the receiver enables detection of the frequency band within which the receiver can be connected to the transmitter by radio and the transmission quality level to be higher than a predetermined threshold, so as to notify the user if the current position of the receiver is acceptable or not,
  in which when the notification indicates that the current position of the receiver is unacceptable the notification indicates (i) a cause as to why the current position of the receiver is unacceptable or (ii) a countermeasure to change an unacceptable condition to an acceptable condition.

* * * * *